(12) United States Patent
Harford et al.

(10) Patent No.: US 7,672,883 B2
(45) Date of Patent: Mar. 2, 2010

(54) SYSTEM AND METHOD FOR MATCHING AN OFFER WITH A QUOTE

(75) Inventors: Barnaby Merrick Harford, Seattle, WA (US); Sendi Widjaja, Bellevue, WA (US); Maja Bogdanovic, Seattle, WA (US); Clair Hector, Seattle, WA (US)

(73) Assignee: Expedia, Inc., Bellevue, WA (US)

( * ) Notice: Subject to any disclaimer, the term of this patent is extended or adjusted under 35 U.S.C. 154(b) by 774 days.

(21) Appl. No.: 10/830,781

(22) Filed: Apr. 23, 2004

(65) Prior Publication Data

US 2004/0210513 A1      Oct. 21, 2004

Related U.S. Application Data

(63) Continuation of application No. 09/648,124, filed on Aug. 25, 2000, now Pat. No. 6,826,543.

(51) Int. Cl.
*G06Q 40/00*   (2006.01)
(52) U.S. Cl. ........... 705/35; 705/5; 705/6; 705/26; 705/27; 705/39
(58) Field of Classification Search ........... 705/35, 705/5, 6, 26, 27, 39
See application file for complete search history.

(56) References Cited

U.S. PATENT DOCUMENTS

| | | | |
|---|---|---|---|
| 5,570,283 A | 10/1996 | Shoolery et al. | |
| 5,634,055 A | 5/1997 | Barnewall et al. | |
| 5,794,207 A | 8/1998 | Walker et al. | |
| 5,797,127 A | 8/1998 | Walker et al. | |
| 5,802,502 A | 9/1998 | Gell et al. | |
| 5,897,620 A | 4/1999 | Walker et al. | |
| 5,995,602 A | 11/1999 | Johnson et al. | |

(Continued)

FOREIGN PATENT DOCUMENTS

EP      1 006 458 A1      6/2000

OTHER PUBLICATIONS

"Fax for the Air," *VARbusiness*, Oct. 1992, p. 14.

*Primary Examiner*—James P Trammell
*Assistant Examiner*—Shahid R Merchant
(74) *Attorney, Agent, or Firm*—Knobbe Martens Olson & Bear LLP

(57) ABSTRACT

Described is a system and method that satisfies offers from customers with quotes from suppliers in a way that increases the likelihood of achieving an acceptable match. The system of the present invention is configured to receive from a customer an offer for a product. The system queries in parallel multiple suppliers for rate quotes on the desired product. Each of the suppliers is ranked according to the lowest rate quoted by each supplier. The supplier quoting the lowest rate is selected as the winner of the offer. The system may then evaluate any other rate quotes provided by the winning provider. The system may satisfy the customer's offer with the winning provider at a higher rate (if one was provided) than the winning rate quoted, up to the customer's offer (perhaps adjusted for a reasonable profit). In this way, even though the provider provides low rate quotes to win the offer, the provider may still realize a much higher rate for the goods or services by quoting additional, higher rate quotes as well.

13 Claims, 13 Drawing Sheets

U.S. PATENT DOCUMENTS

| | | | |
|---|---|---|---|
| 6,012,045 A | 1/2000 | Barzilai et al. | |
| 6,014,644 A | 1/2000 | Erickson | |
| 6,023,501 A | 2/2000 | Wakamatsu | |
| 6,023,685 A | 2/2000 | Brett et al. | |
| 6,076,071 A * | 6/2000 | Freeny, Jr. | 705/26 |
| 6,085,164 A | 7/2000 | Smith et al. | |
| 6,085,169 A | 7/2000 | Walker et al. | |
| 6,108,639 A * | 8/2000 | Walker et al. | 705/26 |
| 6,134,534 A * | 10/2000 | Walker et al. | 705/26 |
| 6,275,808 B1 | 8/2001 | DeMarcken | |
| 6,324,517 B1 * | 11/2001 | Bingham et al. | 705/8 |
| 6,356,878 B1 | 3/2002 | Walker et al. | |

* cited by examiner

| Customer | Authentication Information | E-Mail | Other Info. |
|---|---|---|---|
| | | | |

CUSTOMER DATABASE

FIG. 5

| Hotel ID | Rating | Destination | Area | Average Rates | Other Info. |
|---|---|---|---|---|---|
| 503 | 505 | 507 | 509 | 511 | 513 |
|  |  |  |  |  |  |

501

Hotel Database

FIG. 6

| Bid ID | Cust. ID | Check In Date | Other Bid Info. |
|---|---|---|---|
| 603 | 605 | 607 | 609 |
|  |  |  |  |

601

Bid History Database

SYSTEM AND METHOD FOR MATCHING AN OFFER WITH A QUOTE

CROSS-REFERENCE TO RELATED APPLICATION

This application is a continuation of U.S. application Ser. No. 09/648,124, filed Aug. 25, 2000 now U.S. Pat. No. 6,826,543.

FIELD OF THE INVENTION

The present invention relates to electronic commerce. More specifically, the invention relates to the purchase of travel accommodations, such as hotel rooms, in an electronic exchange transaction.

BACKGROUND OF THE INVENTION

More and more people are purchasing goods and services electronically, such as over the Internet. These mechanisms provide an outlet for suppliers having surplus inventory, and often allow purchasers to obtain desired goods or services at below-market rates. One common example of an electronic exchange between purchasers and suppliers is the "electronic travel agent," used to place an offer for travel accommodations, such as hotel rooms or airline tickets. However, existing electronic exchanges suffer from various problems. For instance, schemes employed by existing systems to satisfy offers from purchasers with quotes from suppliers do not create an incentive for the suppliers to quote their goods or services at rates significantly below market rates because the suppliers cannot benefit from quoting low rates. One reason is that existing systems satisfy a purchaser's offer by simply querying a list of suppliers to determine whether one or more of them can provide accommodations at a given rate, based on the offer value. The first qualified supplier that satisfies the offer is selected as the winner of the offer, even if the selected supplier does not quote the lowest rate. There is no incentive for a supplier to quote a lower rate.

In addition, existing schemes charge a purchaser the value of the purchaser's offer even if that value exceeds what the purchaser would have paid without the aid of the electronic travel service system. In other words, even if the purchaser's offer exceeds a published rate for the accommodations, existing schemes punish the purchaser by charging her the full value of the offer.

An effective electronic exchange system for satisfying an offer by a purchaser with a quote from a supplier has eluded those skilled in the art.

SUMMARY OF THE INVENTION

Briefly stated, the present invention overcomes the problems identified above by providing a system and method that satisfies offers from customers with quotes from suppliers in a way that increases the likelihood of achieving an acceptable match between the offer and a quote. The system of the present invention is configured to receive from a customer an offer for a product. The product may be any commodity available in commerce, such as goods or services. The offer may include specific details to further identify the product being sought. For example, if the offer is for travel accommodations, the offer may identify a travel destination and a price at which the customer is willing to accept accommodations. The offer may additionally identify an area within the destination to more narrowly focus a list of potential suppliers.

The system queries in parallel multiple suppliers for rate quotes on the desired goods or services. Then, rather than selecting the first supplier that satisfies the offer, each of the suppliers are ranked according to the lowest rate quoted by each supplier. The supplier quoting the lowest rate is selected as a preliminary winner with the first right to accept the offer provided that the lowest rate is sufficiently below the offer. At that point, the offer can be matched with the supplier quoting the lowest rate. This system improves over existing electronic exchanges in that the first supplier quoting a satisfactory rate is not necessarily the one selected. Rather, the lowest of multiple potential suppliers is selected. Plus, the consumer may be benefited as well by this incentive to the suppliers to provide at least one low rate.

One improvement to the above-described system is a profit sharing program through which suppliers are not significantly harmed by quoting low rates. In this aspect of the invention, each provider may quote different rates for the same goods or services. For instance, a hotel may return two or more different rates for the same hotel room. The system may select the winning provider in the same manner as above (e.g., by the lowest quoted rate) but then evaluate any other rate quotes provided by the winning provider. The system may satisfy the customer's offer with the winning provider at a higher rate (if one was provided) than the winning rate quoted, up to the customer's offer (typically adjusted for a reasonable broker's profit). In this way, even though the provider provides low rate quotes to win the offer, the provider may still realize a much higher rate for the goods or services by quoting additional, higher rate quotes as well. Yet another improvement to the above-described system is an upgrade reward system through which customers are incentivized to provide higher offers for the goods or services. In this aspect of the invention, the offer provided by the customer identifies a minimum quality rating, such as a star rating for a hotel, that the customer is willing to accept. The queries made to potential providers may additionally request the rating of the goods or services being quoted. In this way, the system may rank the potential providers by both rate quotes and ratings. Then the system may identify as the offer winner the potential provider quoting the highest rating that at least satisfies the customer's offer, and that has the lowest quoted rate. In this way, if a provider quotes a rate that satisfies the customer's offer price and that has a higher rating than acceptable by the customer, the customer is rewarded with better-than-acceptable goods or services at the same price. Optionally, the system may calculate a value, based on the offer value, below which the rate quote must be before upgrading the customer, thereby creating a disincentive for the customer to offer extremely low. For example, the system may adjust the offer value by some factor or a percentage and only upgrade for rate quotes below the adjusted value.

These and other aspects of the invention, together with the benefits and advantages realized, will become apparent from a reading of the following detailed description in conjunction with the drawings, in which:

BRIEF DESCRIPTION OF THE DRAWINGS

FIG. 5 illustrates, in tabular format, one example of the type of information that may be stored within a hotel database employed in one implementation of the present invention;

FIG. 6 illustrates, in tabular format, one example of the type of information that may be stored within an offer history database employed in one implementation of the present invention;

DETAILED DESCRIPTION

One illustrative electronic exchange system constructed in accordance with the invention may be implemented as an electronic travel agent system. The illustrative system may be used to increase hotel occupancy while benefiting consumers in a way that strives to increase the average daily rate booked through the system. The several components of the system are described first, followed by a description of the operation of the system through the interaction of the several components. The illustrative system described is but one of many alternative electronic exchange purchase transactions that can be implemented in accordance with the invention, and the breadth and scope of the invention is not limited to the particular embodiments described here.

Exemplary Computing Device

Figure 1:
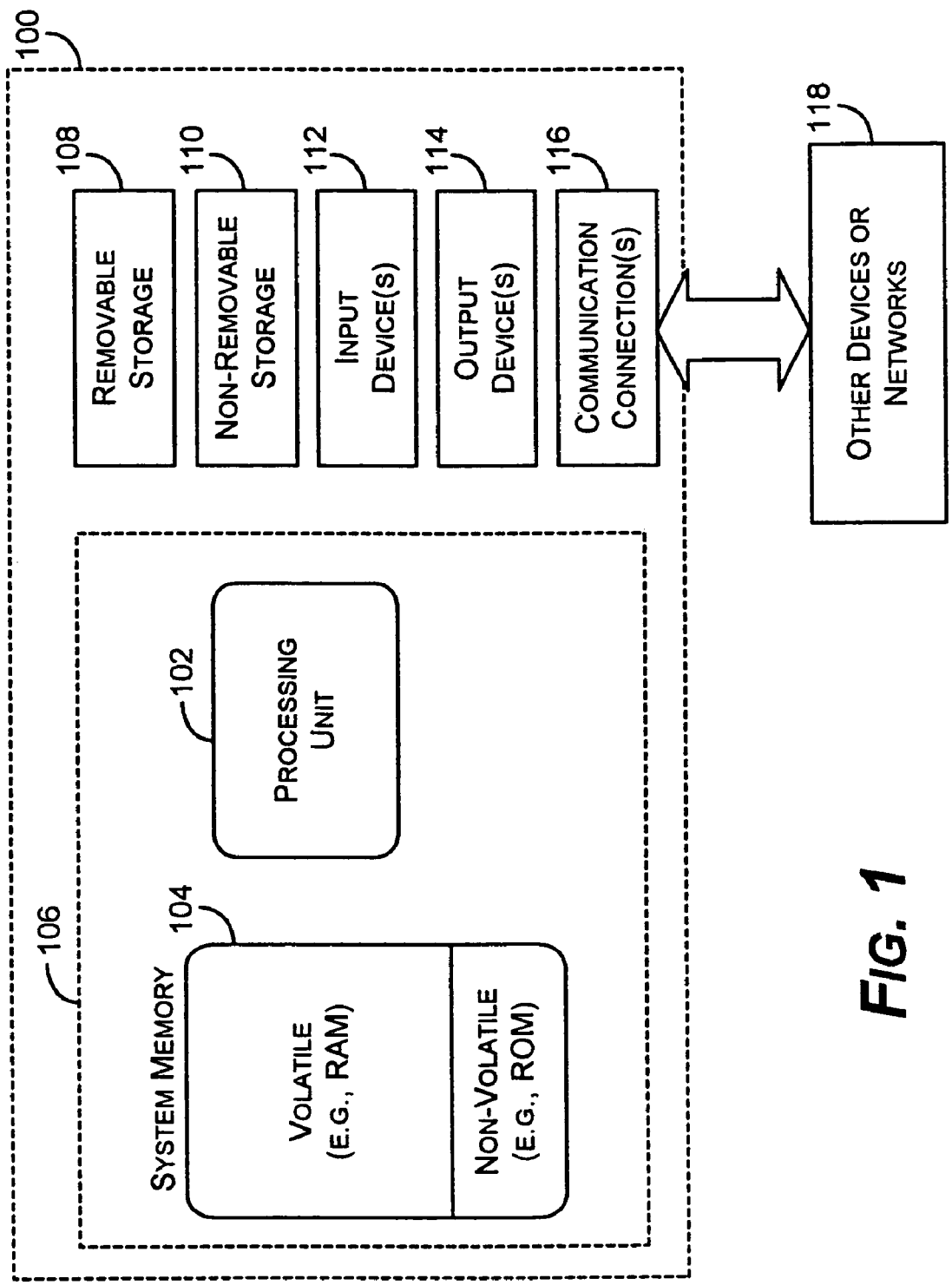
FIG. 1 is a block diagram representing a typical computer system into which one implementation of the present invention may be incorporated.

FIG. 1 is a functional block diagram generally illustrating a computing device 100, one or more of which may be adapted for use in the illustrative system for implementing the invention. The computing device may be, for example, a personal computer, a handheld device such as a cell phone or a personal digital assistant, multi processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

In its most basic configuration, computing device 100 typically may include at least one processing unit 102 and system memory 104. Depending on the exact configuration and type of computing device, system memory 104 may be volatile (such as RAM), non-volatile (such as ROM, flash memory, etc.), or some combination of the two. The basic configuration of the device 100 is illustrated in FIG. 1 within dashed line 106.

Device 100 may also have additional features and functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules, or other data. Memory, 104, removable storage 108, and non-removable storage 110 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by device 100. Any such computer storage media may be part of device 100.

Device 100 includes one or more input devices 112 such as a keyboard, mouse, pen, voice input device, touch input device, scanner, or the like. One or more output devices 114 may also be included, such as a video display, audio speakers, a printer, or the like. Input and output devices are well known in the art and need not be discussed at length here.

Device 100 also contains communications connection 116 that allows the device 100 to communicate with other devices 118, such as over a local or wide area network. Communications connection 116 is one example of communication media. Communication media includes any information delivery media that serves as a vehicle through which computer readable instructions, data structures, program modules, or other data may be delivered on a modulated data signal, such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, electromagnetic (e.g., radio frequency) infrared, and other wireless media. The term computer readable media as used herein includes both storage media and communication media.

Illustrative Electronic Travel Agent System

Figure 2:
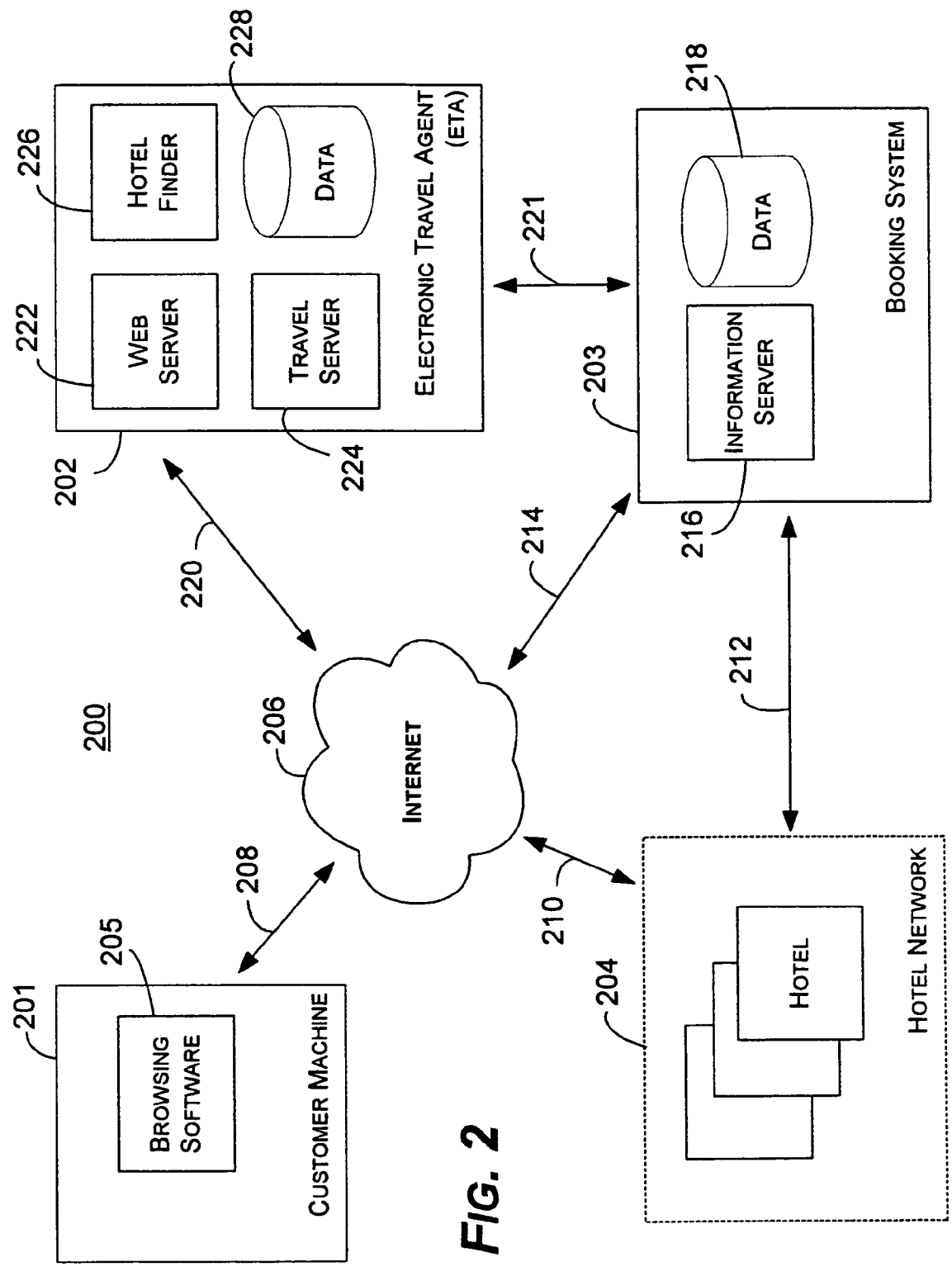
FIG. 2 is a functional block diagram generally illustrating one implementation of an electronic travel agent system constructed in accordance with the present invention.

FIG. 2 is a functional block diagram generally illustrating one implementation of an electronic travel agent system (the system 200) constructed in accordance with the present invention. The system 200 may be implemented as software modules or components stored and executing on one or more computing devices, such as that illustrated in FIG. 1. The system illustrated in FIG. 2 and described here is but one of the many implementations that will become apparent by the teachings of the present invention.

The system 200 includes a customer machine 201, an electronic travel agent 202, an availability determination component 203, such as a Global Distribution System (the booking system), and a network of providers, such as hotels 204, that have agreed to participate in the system 200. Although well-suited for use in conjunction with a hotel network 204, this implementation of the invention has equal applicability to other provider networks and the hotel network 204 is quoted only as one example. As described below, each of these components may include one or more computing devices, such as the computing device 100 described above. Moreover, each of the components may be interconnected over a wide area network, such as the Internet 206. Although the following discussion will make reference to the Internet 206 as a specific wide area network, those skilled in the art will appreciate that any mechanism for connecting multiple computing devices may equally be used.

The customer machine 201 is a computing device connected to the Internet 206 over a network connection 208, such as a dial-up modem connection or digital subscriber line connection. The customer machine 201 may be adapted to interact with other computing devices over the Internet 206 through the use of browsing software 205. The browsing software 205 may be integrated into a subsystem of an operating system executing on the customer machine 201. Via the browsing software 205, a user of the customer machine 201 may retrieve Web pages or other documents from other computing devices attached to the Internet 206, and may additionally provide information to those other computing devices.

Each hotel within the hotel network 204 may either be connected to the Internet 206, such as over network connection 210, or may be directly connected to the booking system 203, such as through a dedicated network connection 212. It should be appreciated that each hotel in the hotel network 204 may be connected to an interface with the booking system 203 in a conventional manner.

The booking system 203 may also have a network connection 214 to the Internet 206 to interface with other computing devices also connected to the Internet 206. The booking system 203 may include and maintain a data store 218 that contains availability and rate information for each of the hotels in the hotel network 204. If it is connected to the Internet 206, the booking system 203 may include information server software 216 for managing transactions with other computing devices over the Internet 206. The booking system 203 is adapted to place queries to or receive from each hotel in the hotel network 204 current availability and rate information, and to store that information in the data store 218. The booking system 203 may make that information available to entities interested in booking travel arrangements, such as the electronic travel agent 202. Moreover, the booking system 203 is adapted to make reservations with hotels in the hotel network 204 upon request by those entities. One example of such a booking system 203 is the Pegasus hotel booking system in common use today.

The electronic travel agent (ETA) 202 may include one or more computing devices, such as that illustrated in FIG. 1, and is connected to the Internet 206 through a network connection 220. The ETA 202 may optionally be connected to the booking system 203 through a dedicated network connection 221. The ETA 202 is illustrated in greater detail in FIG. 3 and described below. Generally described, the ETA 202 includes a Web server component 222, a travel server component 224, a hotel finder component 226, and a data store 228. Although these four components are shown, those skilled in the art, will appreciate that the functions of each described component may be merged into fewer components, or similarly, distributed among more components. The use of four illustrative components is for simplicity of discussion only, and should not be viewed as an exclusive list of components. Through the use of the described components, the ETA 202 interfaces with the customer machine 201 and the booking system 203 to administer an electronic exchange purchase transaction. As described in greater detail below, the ETA, 202 interfaces with the customer machine 201, via the Internet 206, to receive an offer for travel accommodations. The ETA 202 retrieves from the booking system 203 quotes for those travel accommodations made by the hotels in the hotel network 204. The ETA 202 then satisfies, if possible, the offer from the customer machine 201 with a winning hotel in the hotel network 204.

Figures 3, 4:
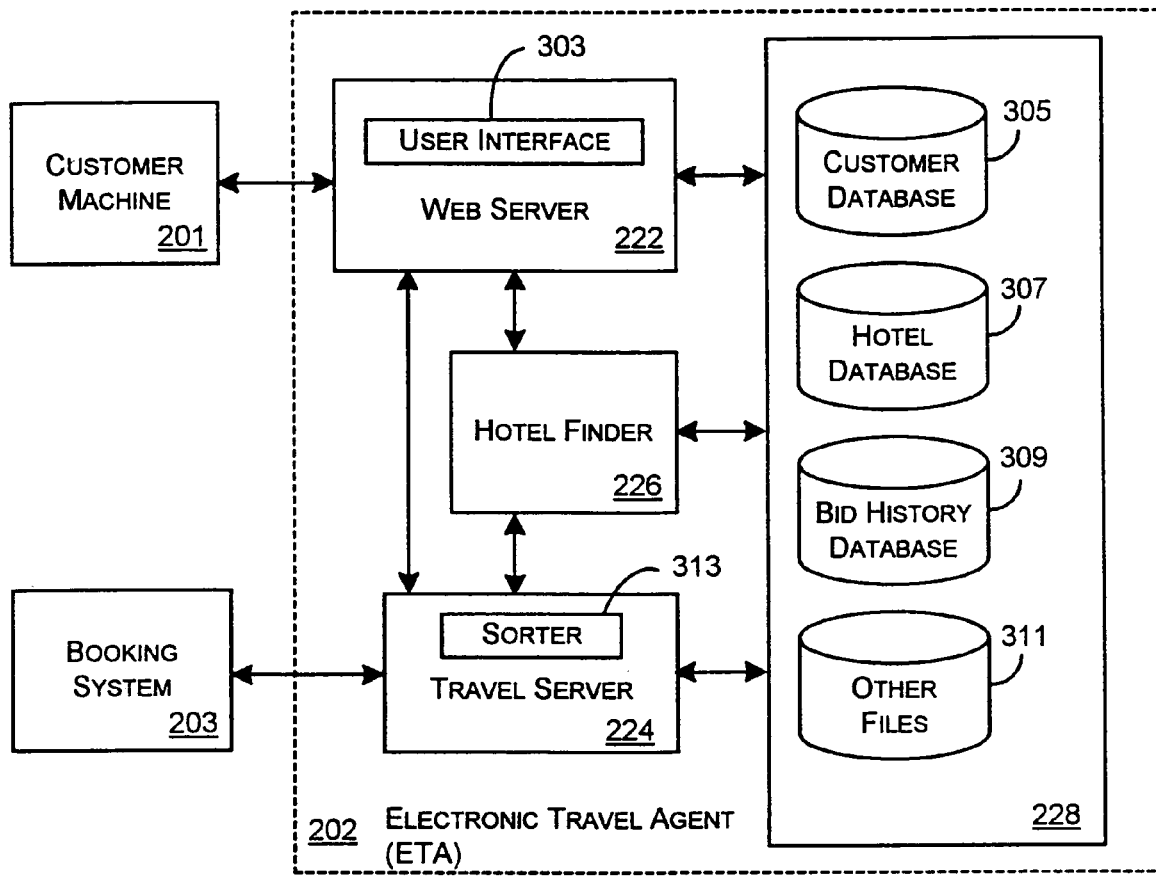
FIG. 3 is a functional block diagram generally illustrating one implementation of an electronic travel agent component of the system illustrated in FIG. 2.
FIG. 4 illustrates, in tabular format, one example of the type of information that may be stored within a customer database employed in one implementation of the present invention.

FIG. 3 is a functional block diagram generally illustrating one implementation of the ETA 202. As mentioned above, the ETA 202 includes a Web server component 222, a travel server component 224, a hotel finder component 226, and a data store 228. The data store 228 of the described embodiment contains various types of information used by the different components of the ETA 202. For instance, the data store 228 includes a customer database 305 that is used to store information related to customers of the ETA 202. FIG. 4 illustrates, in tabular format, one example of the type of information that may be stored within the customer database 305. Referring to FIG. 4, a table 401 includes a record for each customer of the ETA 202. Each record may include a customer identifier 403, authentication information 405 for the customer, an email address 407 for the customer, and other information 409 associated with the particular customer.

The data store 228 also includes a hotel database 307 that contains information on each hotel in the hotel network 204. The hotel database 307 is queried by the hotel finder 226 to identify particular hotels within the hotel network 204 that may satisfy an offer from the customer machine 201. FIG. 5 illustrates, in tabular format, one example of the information that may be stored within the hotel database 307. Referring to FIG. 5, a table 501 includes a record for each hotel in the hotel network 204. Each record includes a hotel identifier 503 that uniquely identifies each hotel in the hotel network 204. The record may also include a rating 505 for the corresponding hotel, such as the familiar "star ratings" (e.g., one star equals economy, five stars equals luxury) in widespread use today. The record additionally geographically identifies where the hotel is located by a destination 507 and possibly an area 509 within the destination. The average rate 511 for the hotel may be included within the record, as well as other information 513 associated with the corresponding hotel.

Returning to FIG. 3, the data store 228 also includes an offer history database 309, which contains the storage information related to offers provided to the ETA 202 by various customers. FIG. 6 illustrates, in tabular format, one example of the information that may be stored within the offer history database 309. Referring to FIG. 6, a table 601 includes a record for each offer provided to the ETA 202. Each record includes an offer identifier 603 to uniquely identify the offer, and the customer identifier 605 of the customer that provided the offer. The table 601 includes a column of information used to purge stale records from the offer history database 309. In the described example, a record for an offer is purged from the offer history database 309 once the check-in date 607 corresponding to the offer has passed. In this embodiment, stale records are periodically purged from the offer history database 309 based on the check-in date 607. Other offer information 609 may also be included in the offer history database 309.

Returning once again to FIG. 3, other files 311 may also be contained within the data store 228. For instance, HTML and XML files served by the Web server 222 may be contained within the data store 228, as well as other information.

The Web server component 222 of the ETA 202 controls the interface between the ETA 202 and the customer machine 201. The Web server 222 includes a user interface component 303 configured to assemble and serve Web pages over the Internet 206 to the customer machine 201. The user interface 303 may also receive information provided by the customer machine 201 through those Web pages. The user interface 303 may then make information received from the customer machine 201 available to the Web server 222, which may in turn make that information available to other components of the ETA 202, such as the hotel finder 226 or the travel server 224.

The hotel finder 226 is configured to access the hotel database 307 when an offer is provided to it by the Web server 222. Based on the parameters provided with the offer, the hotel finder 226 accesses the hotel database 307 to identify potential hotels within the hotel network 204 that may satisfy the offer. It should be noted that the hotel finder 226 need not contact the hotels directly or the booking system 203 to identify hotels that may potentially satisfy the offer. Rather, sufficient information about the participating hotels in the hotel network 204 is stored locally within the hotel database 307.

The Web server 222 and the hotel finder 226 also interface with the travel server 224. The travel server 224 is a component of the ETA 202 configured to interface with the booking system 203 to query for availability and rates of the hotels and the hotel network 204. The travel server 224 is also configured to make hotel reservations with the booking system 203. The travel server 224 includes a sorter component 313 that is configured to manipulate data received from the booking system 203 to rank potential hotels in accordance with one embodiment of the invention.

Illustrative User Interface Screens

FIGS. 7-12 are sample screen displays that may be presented to a user of the customer machine 201 when interfacing with the ETA 202. Each of the sample screen displays represents one or more HTML or XML pages assembled and served by the user interface component 303 of the Web server 222, interpreted and rendered by the Web browsing software 205 of the customer machine 201. The sample screen displays are provided as examples only, and the particular layout of the sample screen displays are not critical to a proper functioning of the invention.

Figure 7:
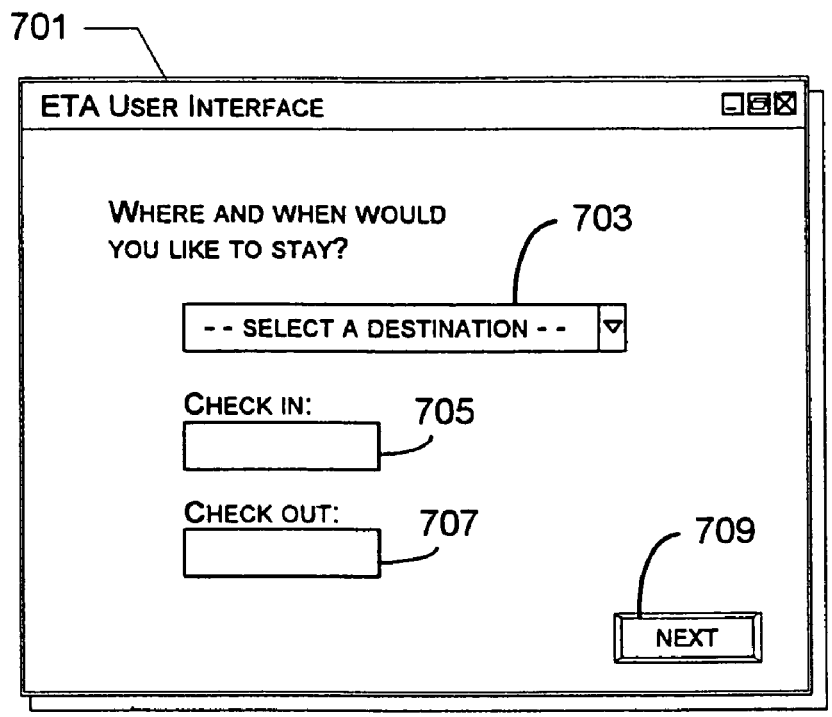
FIGS. 7-12 are sample screen displays that may be presented to a user when interfacing with one implementation of the present invention.

FIG. 7 is a graphical representation of an initial screen display 701 presented to a user to begin the offer process. In this screen display 701, the user is prompted with a destination field 703 so that the user may identify the destination of the travel, such as a particular city. In this implementation, the destination field 703 is a drop-down box that contains preselected destination names from which the user may choose, corresponding to at least some of the hotels that have agreed to participate. The user is also prompted with a check-in field 705 and a check-out field 707 which together allow the user to define the desired lodging dates. By activating the next button 709, the user causes the information provided in the several fields on the initial screen display 701 to be posted to the Web server 222, where it is stored. Activating the next button 709 may also cause the user interface component 303 to transmit to the customer machine 201 an area selection screen display.

Figure 8:
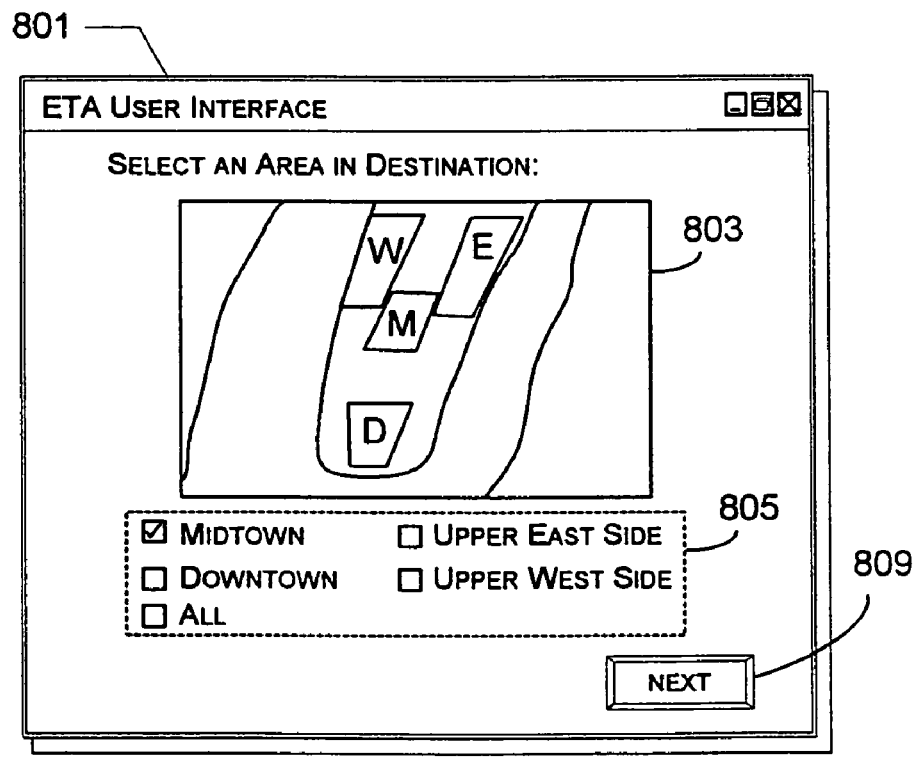

FIG. 8 is a graphical representation of an area selection screen display 801. Each particular destination (e.g., a city) may be further subdivided into "areas" to allow the user to more narrowly specify the location where the user will travel. In this embodiment, the area selection screen display 801 prompts the user with a map 803 of the particular destination previously identified. Within the map 803 are graphical representation of areas from which the user may choose. For instance, in the sample screen display illustrated in FIG. 8, map 803 includes four areas (midtown, downtown, upper east side, upper west side) within the selected destination.

The area selection screen display 801 also includes selection fields 805 that allow the user to select, such as by clicking on the check boxes or the map, one or more areas of interest to the user within the selected destination. By activating the next button 809, the user causes the information provided in the several fields on the area selection screen display 801 to be posted to the Web server 222, where the information is stored. Activating the next button 809 may also cause the user interface component 303 to transmit to the customer machine 201 an offer-price screen display.

Figure 9:
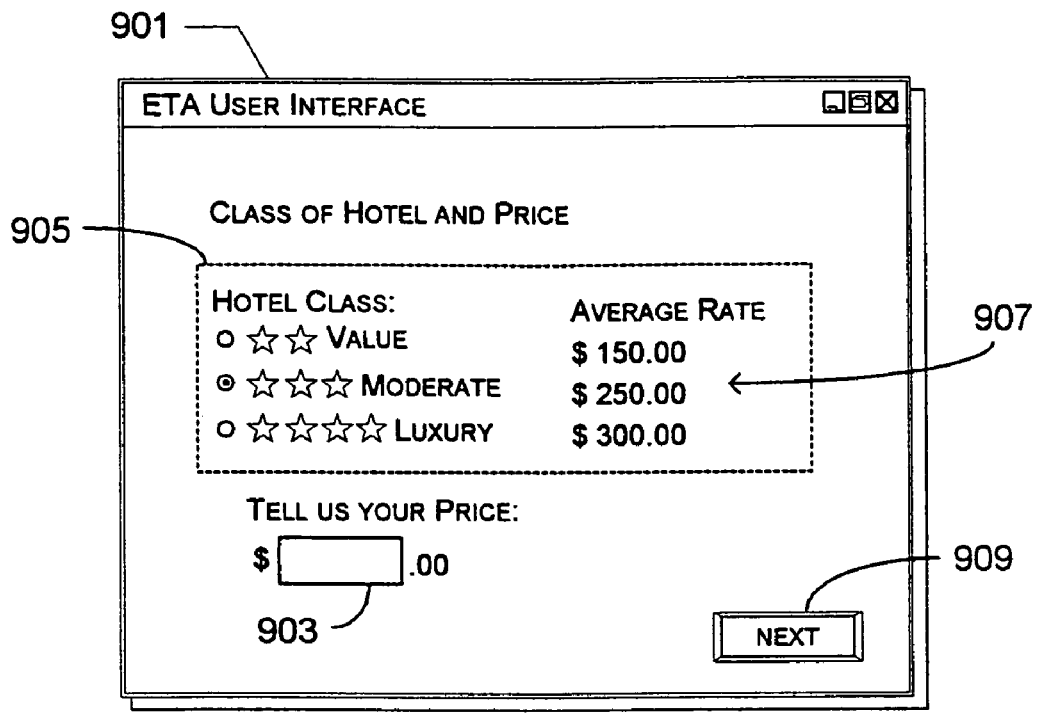

FIG. 9 is a graphical representation of an offer-price screen display 901. In this screen display 901, the user is prompted to enter an offer price in an offer price field 903. The user is also prompted to identify a minimum acceptable hotel class rating, such as through a series of radio-button selection fields 905.

The offer-price screen display 901 may be generated by the user interface component 303 of the Web server 222 based on information provided through the other screen displays. For example, the Web server 222 (FIG. 3) may query the hotel database 307, via the hotel finder 226, for information about the hotels within the area or areas selected by the user in the area selection screen display 801. That information may then be incorporated into the offer-price screen display 901 when presented to the customer machine 201. In that way, the user may be presented with information tailored to the specific area of interest. More specifically, the offer-price screen display 901 may include the average published rates 907 for the participating hotels in the selected areas. Moreover, if there are no hotels of a particular class rating in the selected area, those nonexistent class ratings are not presented in the offer-price screen display 901 (e.g., no one-star or five-star hotels in the selected area). Optionally, the offer-price screen display 901 (or any other screen display) may provide the customer with an option of identifying particular hotels that the customer deems to be undesirable, and which should be avoided during the electronic exchange process. Again; by activating the next button 909, the user causes the information provided in the several fields on the offer-price screen display 901 to be posted to the Web server 222, where the information is stored. Activating the next button 909 may also cause the user interface component 303 to transmit to the customer machine 201 an identification screen display.

Figure 10:
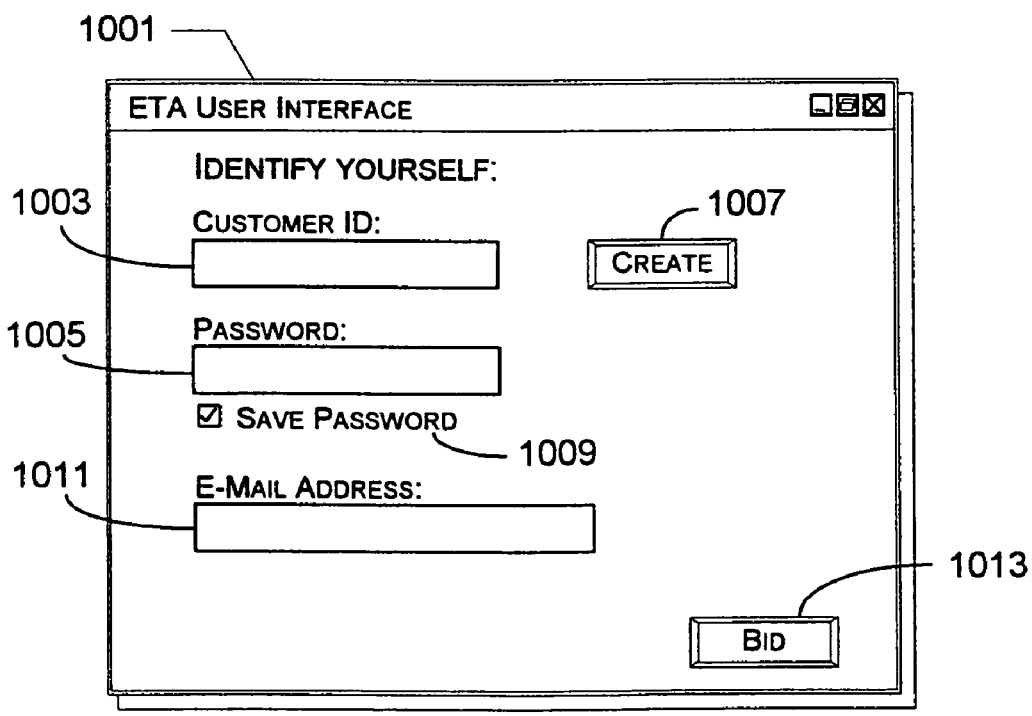

FIG. 10 is a graphical representation of an identification screen display 1001 that may be used to prompt the customer to identify himself to the ETA 202 and initiate the offer matching process. The customer may be presented with a customer ID field 1003 and a password field 1005. Together those fields allow the customer to identify himself if the customer already has an account with the ETA 202. If not, then the customer may activate a create account button 1007 to retrieve a create account screen display, illustrated in FIG. 11 and described below. The identification screen display 1001 may additionally include a check box field 1009 to allow the customer to request that the password be saved to the customer machine 201. The identification screen display 1001 may additionally prompt the customer for an e-mail address 1011 to which confirmation may be transmitted. By activating the offer button 1013, the customer may cause the information provided on the identification screen display 1001 to be transmitted to the ETA 202, thereby causing the ETA 202 to begin attempting to find a match for the offer.

Figure 11:
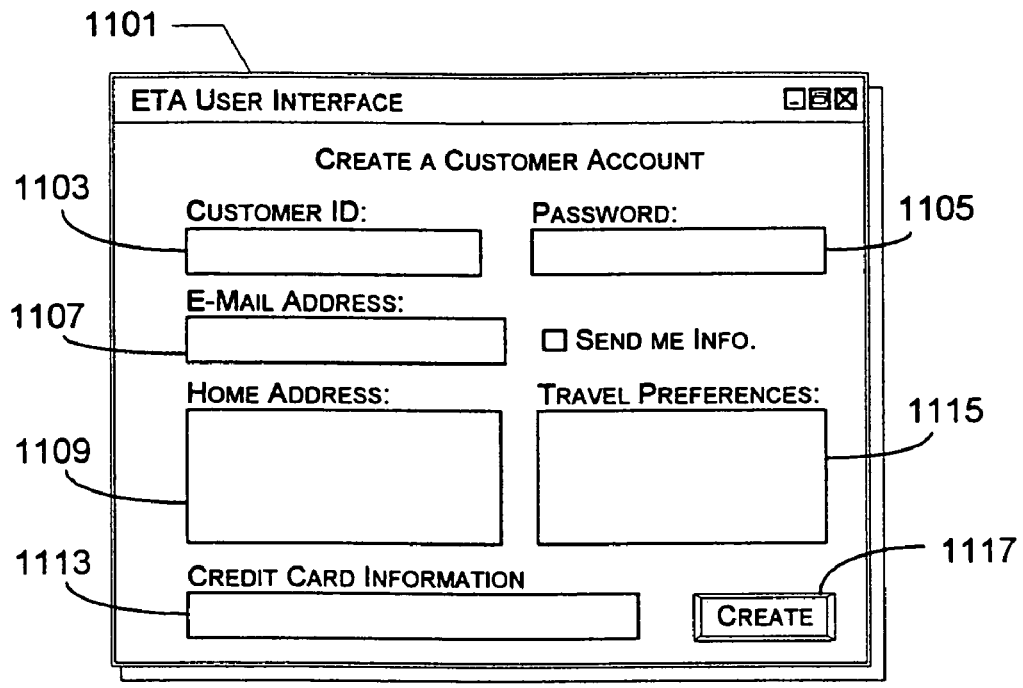

FIG. 11 is a graphical representation of a create account screen display 1101 that may be used to allow the customer to create an account with the ETA 202. The various input fields on the create account screen display 1101 allow the customer to provide sufficient information to create the account. For example, the customer may provide a desired customer ID 1103 (e.g., screen name), a desired password 1105, an e-mail address 1107, a home or mailing address 1109, credit card information 1113, and/or other information, such as travel preferences 1115. Activating the create button 1117 causes the information in the various fields to be posted to the Web server 222, which in turn stores the information as a new record in the customer database 305. The create button 1117 may additionally return control to the identification screen display 1001 to proceed with the current offer transaction.

Figure 12:
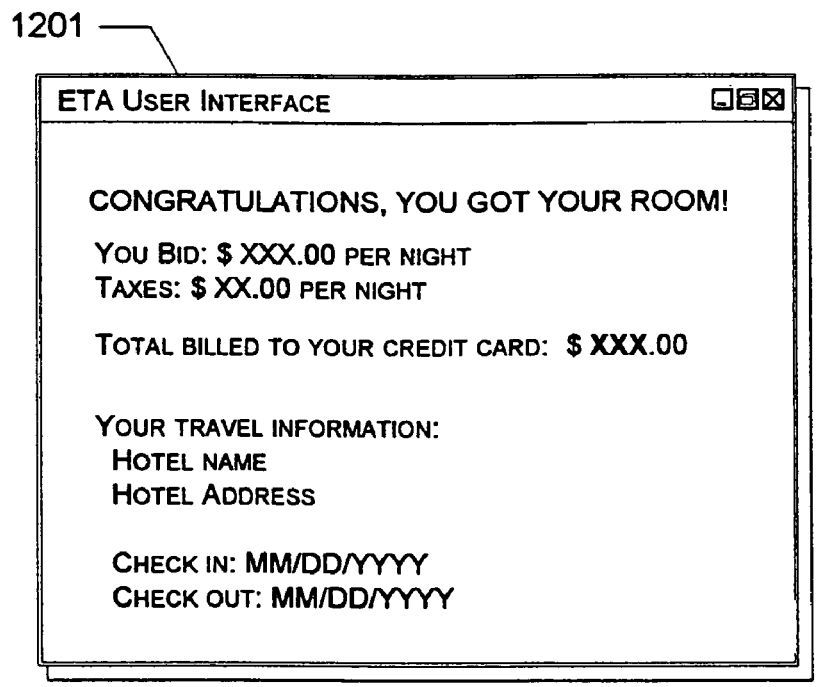

FIG. 12 is a graphical representation of a reporting screen display 1201 that may be used to report a successful electronic exchange match (as described in detail below) to the customer machine 201. The reporting screen display 1201 may present the customer with confirmation that the customer's offer has been satisfied, or with notice that it was not. As cant be understood, when the system 200 attempts to book the travel services, the quotes supplied by the providers other than a satisfying quote are not shown to the user. The sample reporting screen display 1201 of FIG. 12 reflects a confirmation of successfully satisfying the offer. The transaction particulars (e.g., the amount charged to the customer's credit card) may be presented to the user as a record of the transaction.

In summary, the preceding discussion has been directed to describing the configurations and functions of each of the several components, data structures, and subsystems of the electronic travel agent system generally depicted in FIG. 2. The following discussion is presented as a detailed description of the interactions of the described components, data structures, and subsystems through processes performed in accordance with implementations of the invention.

Operation of an Exemplary Electronic Exchange Matching System

FIGS. 13-19 are logical flow diagrams that generally illustrate several processes performed by the illustrative electronic travel agent system illustrated in FIGS. 1-12 and described above. The general and specific operation of the system 200 is illustrated through the several flow diagrams described below, with reference to the components of the system described above and illustrated in FIGS. 1-12.

Figure 13:
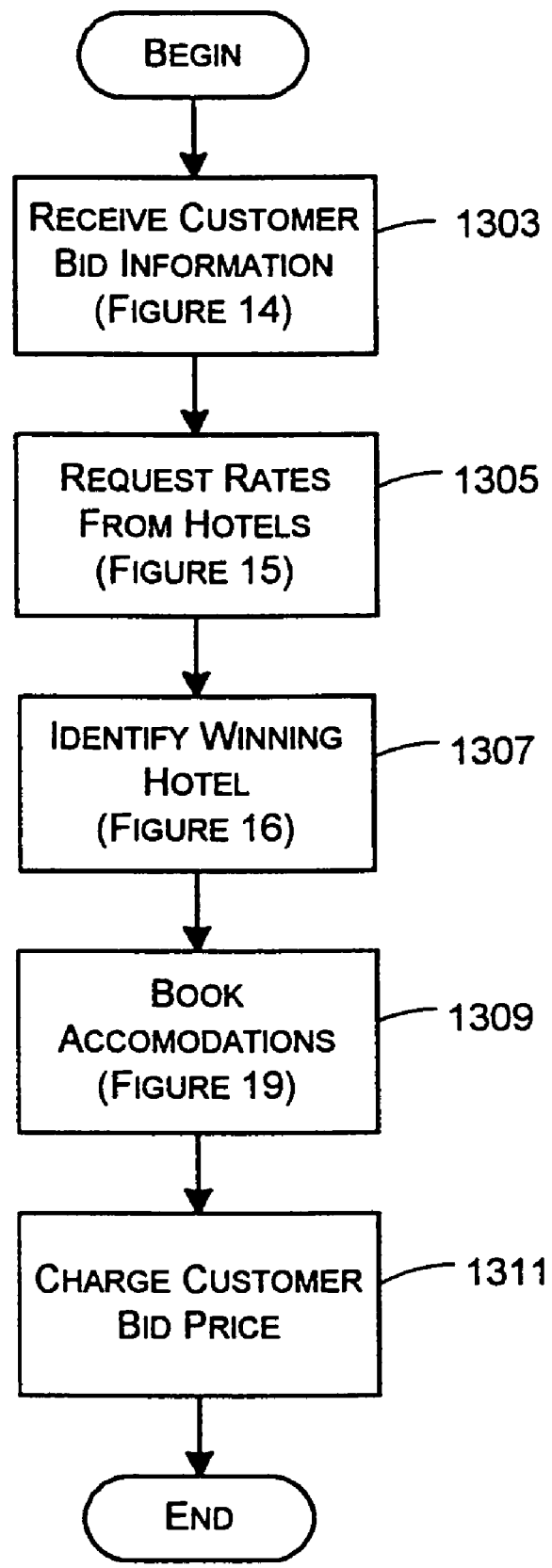
FIG. 13 is a logical flow diagram generally illustrating a process performed by one implementation of the present invention to satisfy an offer from a customer with a quote from one or more suppliers.

FIG. 13 is a logical flow diagram generally illustrating a process performed by the system 200 to satisfy an offer from a customer with a quote from one or more suppliers. The process begins at step 1303, where the system 200 receives customer offer information. The functions performed at step 1303 are illustrated in detail in FIG. 14 and described below. Briefly described, the customer provides sufficient information for the system 200 to initiate the offer matching process. For example, in the described embodiment, the customer should at least identify an offer price and a description of the goods or services, such as a travel destination. The customer may additionally identify an area within the destination and a minimum desired hotel class rating. In addition, the system 200 may request payment (e.g., credit card) information from the customer prior to proceeding with the offer process. Once that information is received, the process continues to step 1305.

At step 1305, rates are requested from suppliers (e.g., hotels) that may possibly satisfy the customer's offer. The functions performed at step 1305 are illustrated in detail in FIG. 15 and described below. Briefly described, the ETA 202 identifies hotels within the hotel network 204 that are within the destination (and area if appropriate) identified in the customer's offer. If a minimum hotel class rating was specified, only hotels satisfying at least that rating are identified. The ETA 202 then requests rates from those identified hotels. For reasons that are explained below, each hotel may return a ladder of rates for the particular accommodations sought. In other words, a hotel may return several, different rates that the hotel is willing to accept for the accommodations (i.e., the same hotel room). After the rates are returned from the identified hotels (or a timeout has occurred), the process continues to step 1307.

At step 1307, the "winning" hotel is identified. The functions performed at step 1307 are illustrated in detail in FIG. 16 and described below. Briefly described, the ETA 202 identifies the hotel returning the lowest rate as the winning hotel. If the offer includes a minimum hotel rating, the ETA 202 may identify the hotel having the highest rating and the lowest price as the winning hotel. It should be appreciated that this brief description assumes that at least one hotel returned a rate below the customer's offer (factoring in a reasonable broker's profit). After the winning hotel has been identified, the process continues to step 1309.

At step 1309, the accommodations are booked with the winning hotel. The functions performed at step 1309 are illustrated in detail in FIG. 19 and described below. Briefly described, the ETA 202 determines whether the winning hotel provided other rates for the accommodations. As mentioned above, each hotel may provide several, different rates for the same accommodations. If the winning hotel provided other rates, the system books the highest rate provided that is still below the customer's offer (adjusted to account for transactional costs, desired broker's profit, and the like). Thus, although the winning hotel provided the lowest rate to win the offer, the hotel is still able to increase its average daily rate for accommodations booked through the system 200 by providing rates in addition to the lowest acceptable rate.

At step 1311, the customer is charged for the accommodations. Typically, the customer's credit card is charged the offer amount, unless, in rare circumstances, the offer amount actually exceeds the published rate for the winning hotel. In that case, to protect the customer, the customer is only charged the published rate. It should be noted that the customer might be charged taxes, which may make the actual amount charged to the customer's credit card slightly higher than the offer amount. Alternatively, the offer amount may be adjusted in advance to reflect an estimate of the taxes that will be charged, in which case the amount charged to the customer's credit card may not exceed the offer amount. Once the customer has been charged, and appropriate notifications given, the process illustrated in FIG. 13 terminates.

Figure 14:
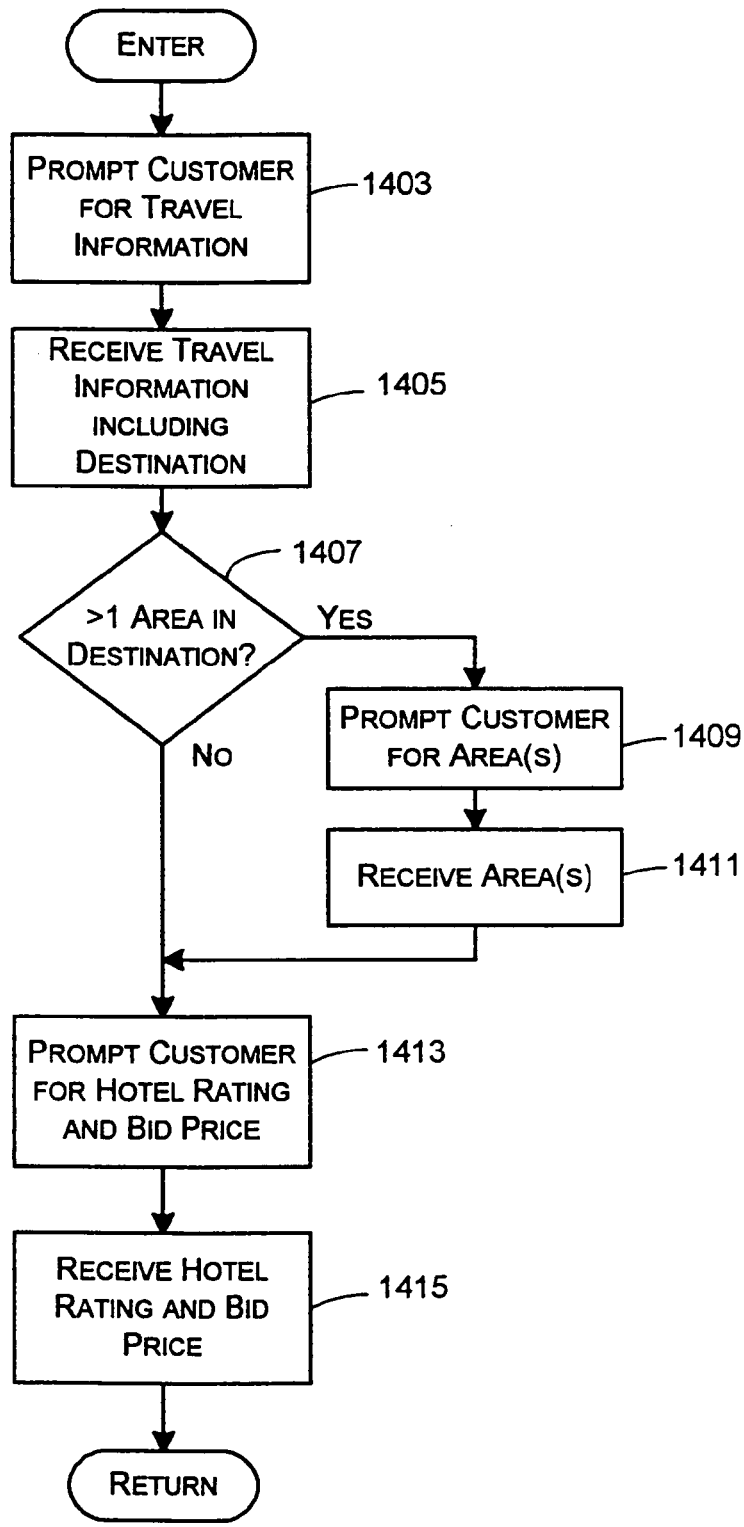
FIG. 14 is a logical flow diagram generally illustrating the functions performed by one implementation of the present invention to receive customer offer information.

FIG. 14 is a logical flow diagram generally illustrating the functions performed at step 1303 of the process illustrated in FIG. 13 to receive customer offer information. The process of FIG. 14 begins at step 1403, where the customer is prompted for information about the customer's travel plans, in particular the travel destination (e.g., a city) and the dates of travel. For example, the customer may be presented with the initial screen display 701 illustrated in FIG. 7 and described above.

At step 1405, the ETA 202 receives the travel information from the customer. The travel information may be received at the Web server 222 via the user interface component 303. As mentioned above, the information provided in each of the several data entry fields of the initial user interface 701 may be transmitted to the Web server 222 in response to activating the next button 709.

At decision step 1407, the ETA 202 determines whether the destination provided with the travel information includes more than a single area. The Web server 222 may issue a request to the hotel finder 226 to make the determination. The hotel finder 226 may query the hotel database 307 to determine whether the identified destination includes multiple areas. If not, the process continues to step 1413, described below. If the identified destination does include multiple areas, the process continues to step 1409.

At step 1409, the customer is prompted to select an area within the destination. To perform this step, the Web server 222, via the user interface 303, may present the customer machine 201 with the area selection screen 801. As discussed above, the area selection screen presents the customer with two or more areas from which to choose one or more desired areas. At step 1411, the Web server 222 receives the selected area or areas from the customer machine 201 and the process continues to step 1413.

At step 1413, the customer is prompted to provide a desired hotel rating and a desired offer price. The customer may be presented with the offer-price screen 901 illustrated in FIG. 9 and described above. Optionally, the Web server 222, via the hotel finder 226 and hotel database 307, may identify which class (e.g., hotel star rating) of accommodations is available within the customer's selected area or areas. Likewise, the Web server 222, via the hotel finder 226 and hotel database 307, may calculate an average rate for each class of hotel. That information may be incorporated into the offer-price screen 901 prior to transmission to the customer machine 201. In that manner, the customer is presented with only options that have actual meaning in the customer's selected areas. The ETA 202 receives, via the Web server 222, the customer's minimum desired hotel rating and the offer price at step 1415.

Figure 15:
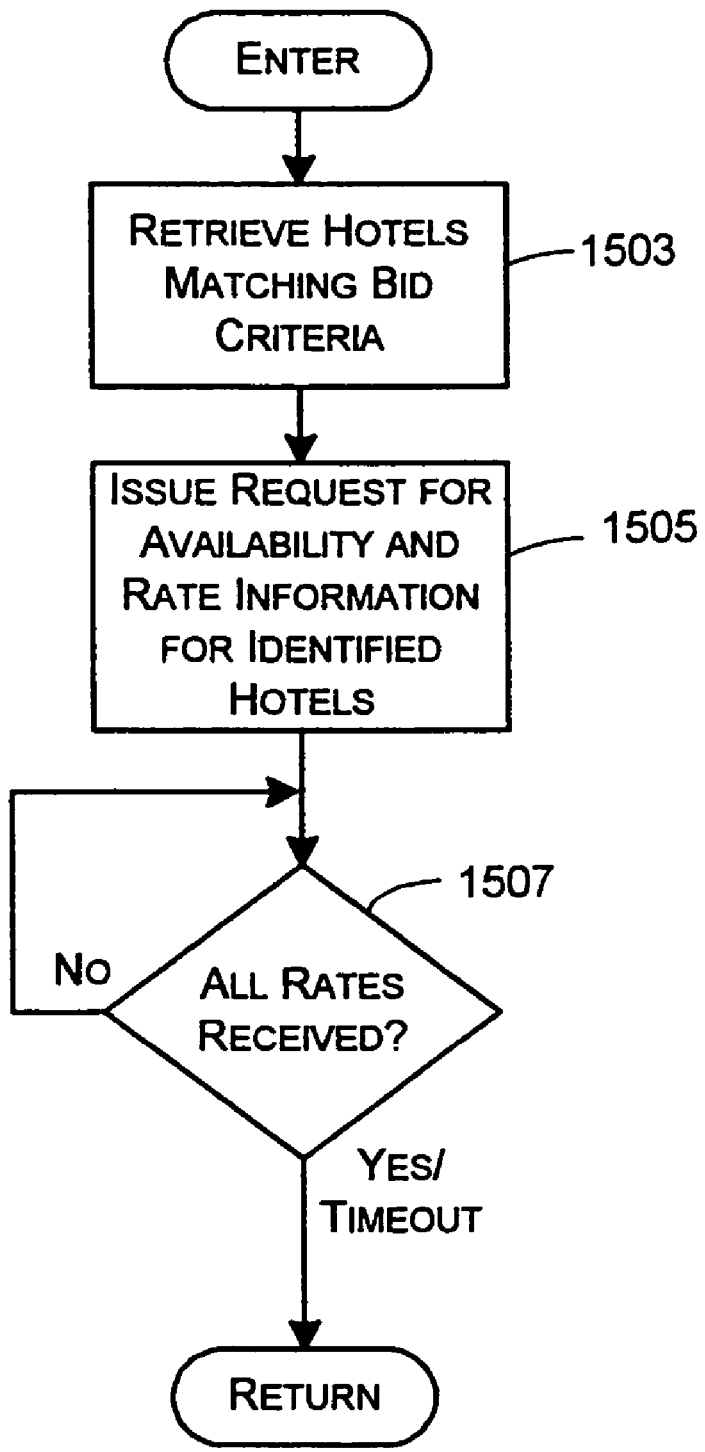
FIG. 15 is a logical flow diagram generally illustrating a process performed by one implementation of the present invention to request rates from hotels within selected areas.

FIG. 15 is a logical flow diagram generally illustrating a process performed by the ETA 202 to request rates from hotels within the customer's selected areas. The process begins at step 1503 where the hotels within the hotel network 204 that satisfy the customer's defined criteria are identified. For instance, the hotel finder 226 may retrieve the hotel identifiers for those hotels in the hotel database 307 that are within the customer's selected areas and which have the customer's minimum desired rating. Alternatively, the hotel finder 226 may retrieve only a limited number of the hotels from the hotel database 307. For example, to avoid overwhelming the booking system 203, the hotel finder 226 may retrieve only ten (or any other number) randomly-selected hotels within the selected areas. The hotel finder 226 may additionally retrieve a number of identifiers associated with hotels having a higher rating than the minimum set by the customer. Once the potential hotels are identified, the process continues to step 1505.

At step 1505, a request for rates and availability is issued to the booking system 203 for each hotel identified at step 1503. Those skilled in the art will appreciate that each request may be issued by the travel server 224 to the booking system in the form of an "avail" message including the hotel identifier 503 and a rate plan code. The hotel identifier 503 identifies the particular hotel from which availability and rates are requested, while the rate plan code indicates to the booking system 203 that specially negotiated rates are being requested. The request additionally includes other information such as the dates of travel, number of rooms, number of occupants, smoking preference, and the like. A separate request is issued for each hotel.

The process waits at decision step 1507 until a response is received for each request transmitted, or until a timeout occurs. If all the responses are received, the process returns to step 1305 of the process illustrated in FIG. 13. If a timeout occurs, the process returns to step 1305 with those responses that have been received.

Figure 16:
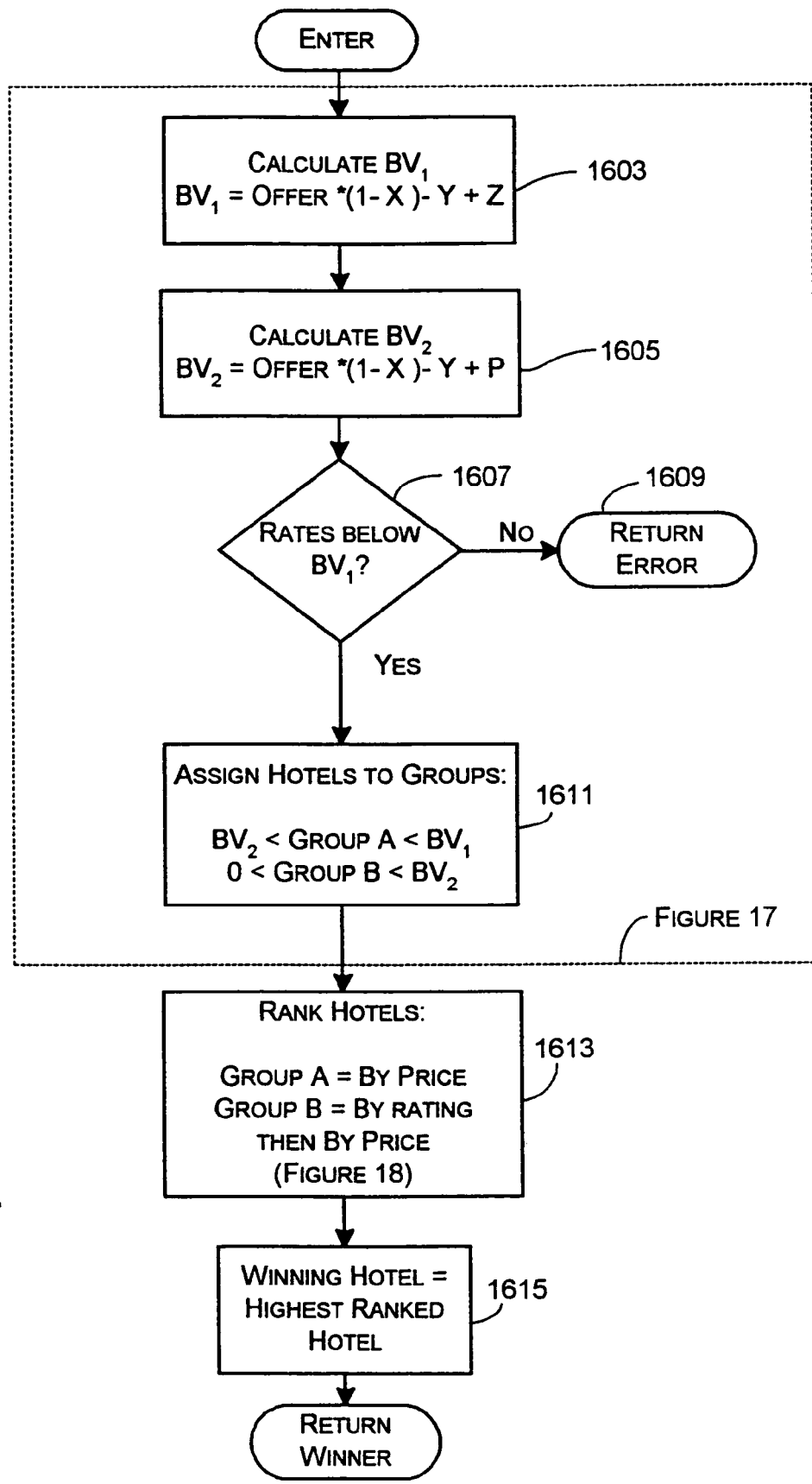
FIG. 16 is a logical flow diagram that generally illustrates a process for identifying a winning hotel from a plurality of responses received by one implementation of the present invention.
Figure 17:
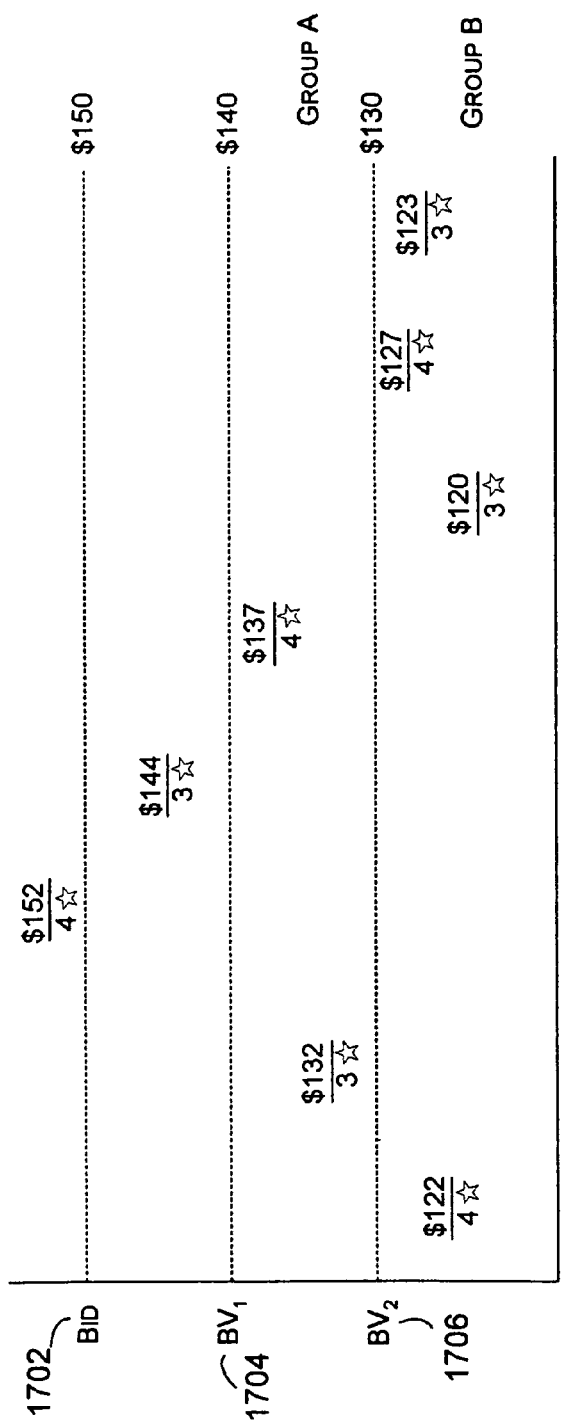
FIG. 17 illustrates each of a plurality of hotels charted based on the value of rates provided by those hotels.
Figure 18:
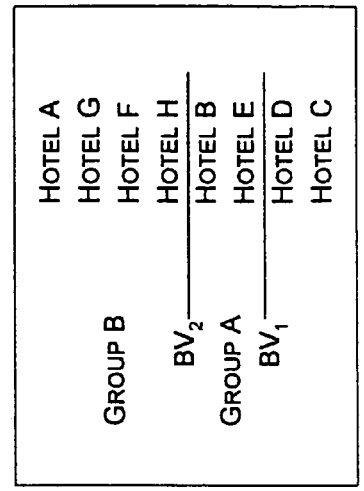
FIG. 18 illustrates several of the hotels' charted in FIG. 17 stack-ranked in accordance with the process illustrated in FIG. 16.

FIG. 16 is a logical flow diagram which, in conjunction with FIGS. 17 and 18, generally illustrates a process for identifying a winning hotel from those responses received by the travel server 224. Steps 1603-1611 (within the dashed-line box) illustrate a subprocess by which the relevant hotels are grouped for evaluation. Steps 1603-1611 are best described with reference to the chart illustrated in FIG. 17. The process illustrated in FIG. 16 will be described in the context of an example hotel-rate query in which eight hotels (Hotel A through Hotel H) each returned a set of rates for accommodations. The offer amount for this example is $150. The lowest rate provided by each hotel is a follows: Hotel A $122, Hotel B $132, Hotel C $152, Hotel D $144, Hotel E $137, Hotel F $120, Hotel G $127, and Hotel H $123.

At step 1603, the ETA 202 calculates a value, $BV_1$, that represents the customer's offer amount adjusted for the transactional costs of booking the accommodations and also adjusted for any promotional or other special circumstances. $BV_1$ is calculated using the following equation:

$$BV_1 = \text{Offer}*(1-X) - Y + Z$$

where "Offer" is the customer's offer amount, "X" is the cost of the transaction as a percentage, "Y" is a fixed cost of the transaction, and "Z" is a factor which allows for promotions or other variances to the equation (may be either positive or negative, depending on circumstances). Thus, $BV_1$ is the value above which it is economically impractical to pursue booking accommodations. In this example, the offer amount is $150 and the calculated value of $BV_1$ is $140.

At step 1605, the ETA 202 calculates another value, $BV_2$, that represents the customer's offer amount adjusted only for the transactional costs and for a minimum desired profit. $BV_2$ is calculated using the following equation:

$$BV_2 = \text{Offer}*(1-X) - Y + P$$

where "Offer" is the customer's offer amount, "X" is the cost of the transaction as a percentage, "Y" is a fixed cost of the transaction, and "P" is the minimum desired profit for the transaction. In this example, the offer amount is $150 and the calculated value of $BV_2$ is $130.

At decision step 1607, a determination is made whether hotels have provided rate quotes below $BV_1$. In other words, if it would not be economically practical to book a reservation at any of the rates quoted by the selected hotels, then the customer's offer amount is too low and the process returns an error at step 1609. The error may be handled in any conventional manner, such as by prompting the customer for more information or simply indicating to the customer that a match could not be found. In addition, the offer history database 309 may be updated to reflect the offer.

At step 1611, the hotels are each assigned to a Group according to the lowest rate provided by each hotel. The functions performed at step 1611 are best described with reference to the chart illustrated in FIG. 17. Referring now to FIG. 17, there is shown a chart having each hotel (e.g., Hotel A to Hotel H) along the X-axis, and dollar values along the Y-axis. The customer's offer 1702 is represented by the uppermost dashed line. Also plotted are the computed values of $BV_1$ 1704 and $BV_2$ 1706. The data points plotted on the chart represent the lowest rate quoted by each of the several hotels. For example, Hotel A, a four-star hotel, provided a rate quote below $BV_2$. It should be appreciated that each of the several hotels may have provided multiple rate quotes, but only the lowest provided by each is represented on the chart in FIG. 17.

Returning to step 1611 of FIG. 16, and still referring to FIG. 17, those hotels with rates within the range between $BV_1$ and $BV_2$ (e.g., $130<rate<$140) are assigned to Group A, while those hotels with rates below $BV_2$ (e.g., rate<$130) are assigned to Group B. Thus, in this example, Hotels B ($132) and E ($137) are in Group A, while Hotels A ($122), F ($120), G ($127), and H ($123) are in Group B. Those hotels not having a lowest rate below $BV_1$ (e.g., Hotels C ($152) and D ($144)) are discarded.

At step 1613, the hotels in Groups A and B are stack ranked. The hotels in Group A (e.g., Hotels B and E) are ranked strictly according to price (e.g., without regard to hotel class), e.g., the lower the price the higher the ranking. The hotels in Group B (e.g., Hotels A, F, G, and H) are ranked first according to hotel class rating (e.g., the higher the rating, the higher the ranking), and then by price (again, the lower the price, the higher the ranking). The resulting stack is illustrated in FIG. 18. Thus, it will be appreciated that the hotels are ranked as follows:

| | | | |
|---|---|---|---|
| highest | Hotel A | $122 | 4 star |
| | Hotel G | $127 | 4 star |
| | Hotel F | $120 | 3 star |
| | Hotel H | $123 | 3 star |
| | Hotel B | $132 | 3 star |
| lowest | Hotel E | $137 | 4 star |

At step 1615, the hotel ranked the highest (Hotel A in this example) is selected as the winning hotel. It should be appreciated, with reference to FIG. 17, that Hotel A is the winning hotel despite the fact that another hotel, Hotel F, actually provided a lower rate quote (i.e., $120<$122). Indeed, under the scheme employed by this embodiment of the invention, even Hotel G ranks above Hotel F despite the higher cost of Hotel G (i.e., $127 versus $120). This is a result of giving preference to the hotel class rating over price for those Hotels that provide rate quotes below $BV_2$. When the winning hotel is selected, the process returns the winner to step 1307 of the process illustrated in FIG. 13.

Figure 19:
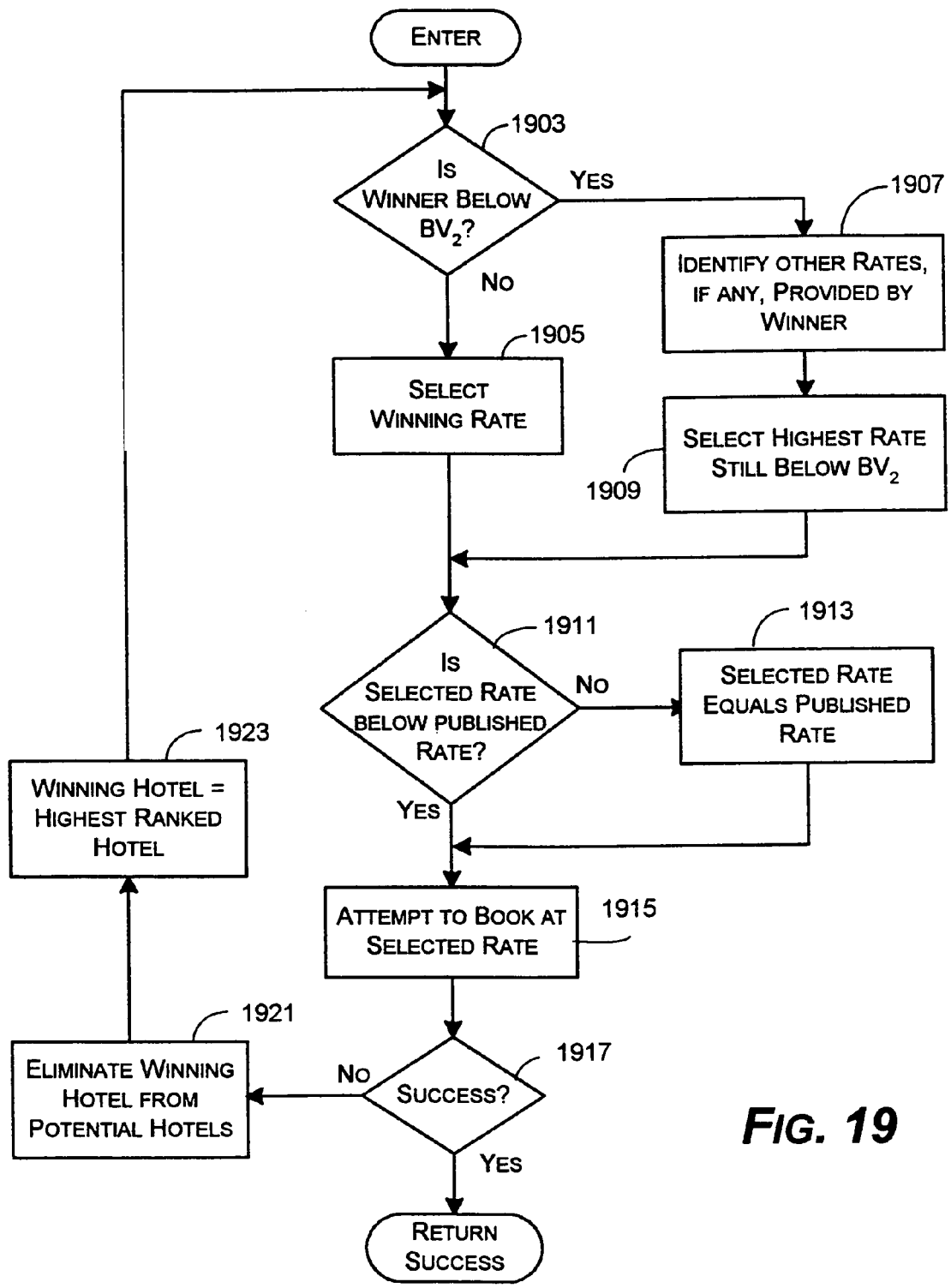
FIG. 19 is a logical flow diagram generally illustrating a process for booking accommodations with a hotel having been identified as a winner by one implementation of the present invention.

FIG. 19 is a logical flow diagram generally illustrating a process for booking the accommodations with the winning hotel. It will be appreciated from the following discussion that, although the hotel having the lowest quoted rate is selected as the winner of the offer, the actual rate booked for the accommodations may be higher than the winning rate if the winning, hotel provided multiple rates. The process begins at decision block 1903 where a determination is made whether the rate used to select the winning hotel is below $BV_2$. For instance, the travel server 224 or other component of the ETA 202 may compare the winning hotel's rate against the value of $BV_2$ calculated above. If that rate is not below $BV_2$, the process continues to step 1905, where the lowest rate is selected to be booked for the accommodations. However, if the winning rate is below $BV_2$, the process continues to step 1907.

At step 1907, the travel server 224 determines whether the winning hotel provided any other rates for the accommodations. As mentioned above, in response to the request for availability, the several hotels may submit several different rates for the same accommodations. If the winning hotel provided other rates in addition to the rate that won the offer, the travel server 224, at step 1909, selects the highest such rate that is still below $BV_2$ as the rate to be booked. In this manner, although the hotel was willing to provide accommodations at the winning rate, the hotel may be benefited by the system 200 in the form of bookings at rates that are higher than the lowest rate risked by the hotel, yet still satisfy the customer's offer.

At decision step 1911, a determination is made whether the rate selected for booking (e.g., either the winning rate or a higher rate) is higher than the winning hotel's published rate for the accommodations. Decision step 1911 is essentially a customer-protection reality check to ensure that customers are not charged for accommodations made through the system 200 in excess of what would be charged having gone through conventional travel arrangements. If the selected rate is above the published rate, then, at step 1913, the published rate is selected for booking and the process continues to step 1915. Otherwise, the currently selected rate remains the desired rate and the process continues to step 1915.

At step 1915, the travel server 224 attempts negotiate the purchase of the product, in this example attempts to book the accommodations with the booking system 203 at the selected rate. If, at decision step 1917, the travel server 224 is successful at booking the accommodations at the selected rate, the process returns success to step 1309 illustrated in FIG. 13. However, if the travel server 224 fails to successfully book the accommodations, the process continues to step 1921.

At step 1921, the travel server 224 was unable to book the accommodations with the winning hotel; for example, a hotel providing a rate quote may respond that it no longer has availability at that rate. Accordingly, the winning hotel is removed from the ranked list of potential hotels (illustrated in FIG. 18). Then, at step 1923, the newly-highest ranking hotel is selected as the new winning hotel. The process then returns to decision step 1903 and repeats as described above.

Although the system chosen to describe the present invention is an electronic travel agent system, those skilled in the art will appreciate that many other electronic exchanges may benefit equally from the present invention. Moreover, the described implementations of the invention are susceptible to various modifications and alternative constructions. It should be understood, that there is no intention to limit the invention to the specific form or forms disclosed, but on the contrary, the intention is to cover all modifications, alternative constructions, and equivalents falling within the spirit and scope of the invention.

What is claimed is:

1. A tangible computer-readable storage medium having computer-executable instructions implemented by a computing system for matching an offer for a product, comprising:
   receiving from a customer machine an offer representing a value that the customer is willing to exchange for a product;
   receiving a plurality of responses from suppliers to provide the product to the customer, wherein at least one of the plurality of responses includes a rating provided in a respective response, the rating associated with the product; and
   after receiving the plurality of responses:
      ranking each supplier according to a lowest price quote in the plurality of responses;
      selecting a supplier based on at least one of a lowest quote and a rating provided in association with the product, wherein the selected supplier response includes a first and a second price quote, the first price quote corresponding to a lowest price quote for the selected supplier; and causing a matching of the offer with the selected supplier at the second price quote provided by the selected supplier.

2. The tangible computer-readable storage medium of claim 1, wherein at least one response from the plurality of responses includes a quality rating associated with the product quoted by the supplier.

3. The tangible computer-readable storage medium of claim 1, wherein the offer from the customer includes a quality rating associated with the product quoted by the supplier corresponding to the response.

4. The tangible computer-readable storage medium of claim 1, wherein the product is associated with a characteristic having a rating, wherein the offer specifies an acceptable rating value, and wherein at least one of the plurality of responses includes a rating of the product being quoted by a corresponding supplier.

5. The tangible computer-readable storage medium of claim 4, wherein the product includes a travel service and the characteristic includes a quality of the travel service.

6. A computer-implemented method for matching an offer for a product with a supplier in a transaction, comprising:

receiving the offer from a customer computing device, the offer identifying a price and a minimum acceptable quality for the product;

calculating, by a computing system, a first value as a function of a desired profit from a proposed transaction, a fixed cost associated with the proposed transaction, and a desired profit associated with the proposed transaction;

obtaining a response, by the computing system, from a plurality of suppliers, each response comprising one or more price quotes for the product, and a rating for the quality of the product being quoted by the corresponding supplier;

identifying, by the computing system, those suppliers from the plurality of suppliers from which responses were obtained that responded with at least one quote below the first value;

ranking, by the computing system, suppliers based on the rating associated with the product being quoted by each identified supplier;

selecting, by the computing system, a supplier from the identified suppliers based on at least one of a lowest price quote and the ranked rating; and causing, by the computing system, a matching of the offer with the selected supplier, the matching of the offer corresponding to a highest of the price quotes submitted by the selected supplier.

7. The computer-implemented method of claim 6, wherein the ranking further comprises ranking the quotes having higher ratings for the quality of the product at a higher level of preference.

8. The computer-implemented method of claim 7, wherein the ranking suppliers based on the ratings associated with the product being quoted further comprises ranking the price quotes having a same rating for the quality of the product in descending order of preference according to the cost associated with each quote.

9. A computer system for matching offers with quotes, comprising:

a computing system, including:

a web server component configured to interface with a customer machine over a network connection and receive from a customer at the customer machine an offer for a product, the offer identifying a price for the product and a minimum quality rating for the product;

a travel server component configured to obtain a plurality of responses from suppliers in response to the offer from the customer;

a sorter component configured to rank the plurality of suppliers according to a lowest price quote provided by each of the plurality of suppliers and on the quality rating associated with the corresponding quote wherein at least one response from the plurality of responses includes a higher and a lower price quote and wherein at least one response from the plurality of responses includes a quality rating associated with the corresponding quote; and wherein the computing system is configured to match the offer with a ranked supplier based on at least one of a lowest price and a quality rating and to cause a purchase of the product for the customer from the ranked supplier at a price corresponding to the higher price quote obtained from the most-preferentially ranked supplier tat satisfies the offer from the customer.

10. The computer system of claim 9, wherein the sorter component is further configured to rank the suppliers based first on the quality rating associated with the corresponding quote and second on the at least one price quote included in the supplier response.

11. The computer system of claim 9, wherein the electronic computing system is further configured to institute a negotiation for the purchase of the product from the ranked supplier at the higher price quote.

12. The computer system of claim 9, wherein the sorter component is further configured to calculate a threshold value, based on the offer, above which the computing system will not match the offer with a supplier.

13. The computer system of claim 12, wherein the sorter component is further configured to discard responses from the plurality of responses that do not provide at least one price quote below the threshold value.

* * * * *